United States Patent [19]

Nishiyama et al.

[11] Patent Number: 4,864,414
[45] Date of Patent: Sep. 5, 1989

[54] IMAGE SIGNAL PROCESSING DEVICE

[75] Inventors: Masaaki Nishiyama, Toyohashi; Takashi Kadono, Toyokawa, both of Japan

[73] Assignee: Minolta Camera Kabushiki Kaishi, Osaka, Japan

[21] Appl. No.: 268,633

[22] Filed: Nov. 8, 1988

Related U.S. Application Data

[63] Continuation of Ser. No. 879,989, Jun. 30, 1986, abandoned.

[30] Foreign Application Priority Data

Jul. 4, 1985 [JP] Japan .................. 60-148077
Jul. 4, 1985 [JP] Japan .................. 60-148075
Jul. 4, 1985 [JP] Japan .................. 60-148076
Jul. 30, 1985 [JP] Japan .................. 60-147453

[51] Int. Cl.$^4$ .................. H04N 1/419; H04N 1/413
[52] U.S. Cl. .................. 358/261.4; 358/261.1
[58] Field of Search .................. 358/260, 261

[56] References Cited

U.S. PATENT DOCUMENTS

| | | | |
|---|---|---|---|
| 4,161,757 | 7/1979 | Spencer et al. | 358/261 |
| 4,276,544 | 6/1981 | Iinuma | 358/261 |
| 4,316,222 | 2/1982 | Subramanian | 358/261 |
| 4,716,471 | 12/1987 | Yokomizo | 358/261.4 |

FOREIGN PATENT DOCUMENTS 58-170280 10/1983 Japan .
60-74776 4/1985 Japan .................. 358/260
60-59623 12/1985 Japan .

Primary Examiner—James J. Groody
Assistant Examiner—Randall S. Svihla
Attorney, Agent, or Firm—Price, Gess & Ubell

[57] ABSTRACT

A signal processing device comprises buffer memory means for outputting a coded signal in parallel by a signal of predetermined bits, shifting means for shifting the coded signal so that the head bit of the coded signal become the head of the outputted signal, decoding memory means for decoding the coded signal to a run length signal having information of the run length of the coded signal, and outputting a shifting signal designating a bit number of the coded signal corresponding to the number to be shifted, into said shifting means. Accordingly, said signal processing device enables to decode a coded signal at a higher speed than a conventional image signal processing device and to output an image signal into an electrophotographic printer or a CRT display, synchronizing with a processing speed of the electrophotographic printer or a sub scanning speed of the CRT display.

13 Claims, 8 Drawing Sheets

IMAGE SIGNAL PROCESSING DEVICE

This is a continuation of application Ser. No. 879,989, filed on June 30, 1986, now abandoned.

BACKGROUND OF THE INVENTION

1. Field of the Invention

The present invention relates to a signal processing device for processing an image signal and outputting the processed image signal into an electrophotographic printer such as a laser printer, an LED printer, etc.

2. Description of the Prior Art

In general, when a host computer outputs an image signal into an output unit such as a laser printer, etc., there are provided two types of image signals, which are a code information, such as a character code, or a dot data of the image. In the printer using the code information, the bit map method or the character map method are generally used. The printer using a bit map method can print out any characters, such as graphic characters, at a desirable position, however, a bit map printer has a cost disadvantage since the printer can not pause during printing, making it necessary for the printer to have a memory capacity sufficient for at least one printed of page data. On the other hand, if the host computer outputs an image signal of dot data the printer at a rate equal to or greater than the printing speed of the printer, the printer can print out the inputted data without pausing. However, the output speed of the host computer is generally lower than the printing speed of the printer and it is necessary for the printer to print out independent of the transferring speed. An electrophotographic printer has a predetermined process speed that depends on the sensitivity of the photoconductor body of the printer, the developing and transferring characteristics etc. Therefore, it is necessary to provide a large capacity buffer memory in the printer for storing the dot data corresponding to one printed page, resulting in the printer being more expensive.

In order to decrease the memory capacity in the printer, an encoding method for compressing the image data is generally used. That is, the data from the host computer is encoded by a predetermined encoding method, resulting in compression of the data. Then, after the compressed data is stored in a buffer memory having a capacity smaller than the aforementioned buffer memory arranged in the printer, the compressed data stored in the memory is decoded and outputted in the printer in synch with the printing speed of the printer.

A decoding method of the image signal is suggested in the Japanese provisional publication (Kokai) No. 58-170280, and the decoding method will be described below, referring to FIG. 1.

Figure 1:
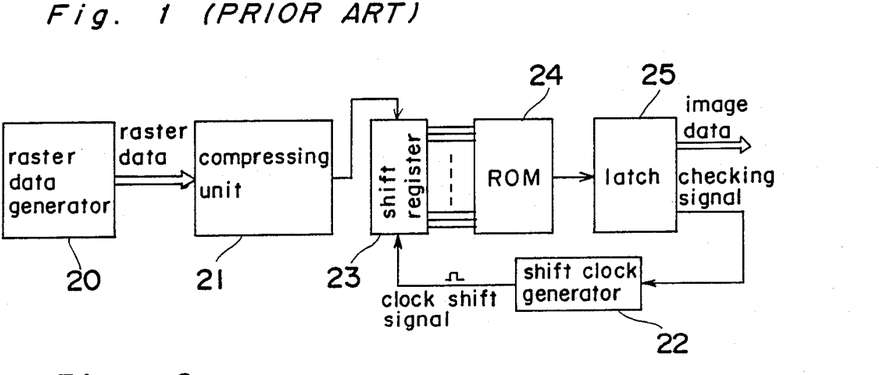
FIG. 1 is a schematic diagram of a conventional image signal processing unit.

FIG. 1 is a schematic diagram showing the decoding method of the image signal. In FIG. 1, raster data outputted from a raster data generator 20 is first compressed by a compressing unit 21. Then, the compressed data is outputted in series into a shift register 23, the shift register 23 latches the inputted serial data bit by bit synchronizing with a clock shift signal outputted from a shift clock generator 22, and the shift register 23 outputs the compressed data in parallel into a ROM 24. The compressed parallel data is decoded by the ROM 24 and the decoded data outputted into a latch 25 of the printer.

When n bits of data are outputted from the compressing unit 21 into the shift register 23, it is necessary for the shift register 23 to shift the inputted data n times and n clock pulses are required to latch on data of the image signal. Therefore, there is a problem since the ROM 24 can not output the data synchronizing with the printing speed of the printer, since it takes a long time for the shift register 23 to latch the serial data of the image signal.

SUMMARY OF THE INVENTION

An essential object is to provide a signal processing device between an image signal generating device and an image forming device where the signal processing device outputs the processed image signal synchronously with the image forming operation of the image forming device.

Another object is to provide a signal processing device for accomplishing the aforementioned process, the signal processing device comprising a small capacity of buffer memory means being inexpensive.

Further object is to provide a signal processing device for encoding an inputted image signal to a compressed signal, storing the compressed signal, and decoding the compressed signal to the image signal at a higher speed than a conventional signal processing device.

According to the present invention, a signal processing device is provided between an image signal generating device said image signal generating device outputting an image signal having dot data of white dot and black dot) and an image forming device for displaying or printing out a dot image in accordance with the image signal outputted from the image signal generating device, said signal processing device being provided for outputting the dot data of the image signal synchronous with an image forming operation of said image forming device said signal processing device further comprises data encoding means for compressing the image signal outputted from said image signal generating device to a coded signal in accordance with a run length corresponding to a continuous number of white dot data or black dot data of the image signal; buffer memory means for continuously storing the coded signal outputted from said data encoding means, and outputting the coded signal in parallel by a signal of predetermined bits; address counting means for assigning an address of said buffer memory means to the signal of the predetermined bits when the coded signal stored in said buffer memory means is read; clock signal generating means for generating a clock signal for determining the assigned address at a predetermined period time and outputting the assigned address into said address counting means; shifting means for outputting a data read demand signal into said buffer memory means and shifting the coded signal outputted from said buffer memory means so that the head bit of the coded signal become the head of the outputted signal and outputting the coded signal; decoding memory means for converting the coded signal outputted from said shifting means to a run length signal having information about the run length of the coded signal, and outputting a shifting signal designating a bit number of the coded signal corresponding to the number to be shifted, into said shifting means; run length counting means for outputting an image signal having the run length of the run length signal and outputting a distinguishing signal of the image signal for designating the white dot or the black dot of the image signal every time when counting the run length designated by the run length signal is completed; and output control means for converting the image signal outputted from said run length counting means to a parallel image signal of predetermined bits, and outputting the parallel image signal in accordance with a data demand signal outputted from said image forming device so as to be synchronous with the image forming operation of said image forming device.

Accordingly, it is not necessary to provide a large capacity of memory because the signal processing device is able to decode compressed data at a higher speed than a conventional image signal processing device thereby allowing the signal processing device to output an image signal into an electrophotographic printer or a CRT display synchronously with the printing speed of the electrophotographic printer or the scanning speed of the CRT display.

DESCRIPTION OF THE PREFERRED EMBODIMENTS

Figure 2:
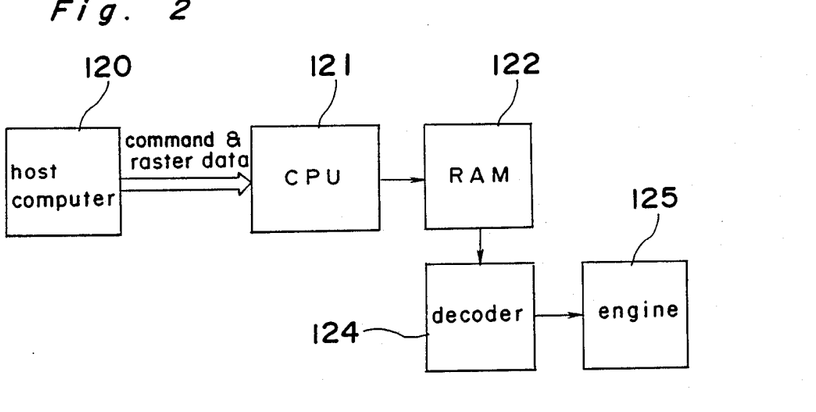
FIG. 2 is a schematic diagram of an image signal processing unit of a preferred embodiment according to the present invention.

FIG. 2 is a schematic diagram of an image signal processing unit of a preferred embodiment according to the present invention, which is used for an electrophotographic printer.

Referring to FIG. 2, the image signal processing unit of the preferred embodiment according to the present invention will be described below. After command and a raster data of an image signal are outputted from a host computer 120 and inputted into a CPU 121, and CPU 121 interprets the inputted command and operates in accordance with the content of the command. After the raster data of the image signal is encoded and compressed by the CPU 121 in accordance with a run length of the raster data obtained by referring to a predetermined encoding table described below in detail, then, the comprssed data of one printed page is written into a RAM 122, the printer begins to operate, and a decoder 124 reads the compressed data stored in the RAM 122 into a RAM portion of the decoder 124, and the decoder 124 decodes the compressed data by referring to a predetermined decoding table stored in the decoder 124. The decoded data is outputted into an engine 125 of the printer, at a rate synchronous with the printing speed of the printer.

Figure 3:
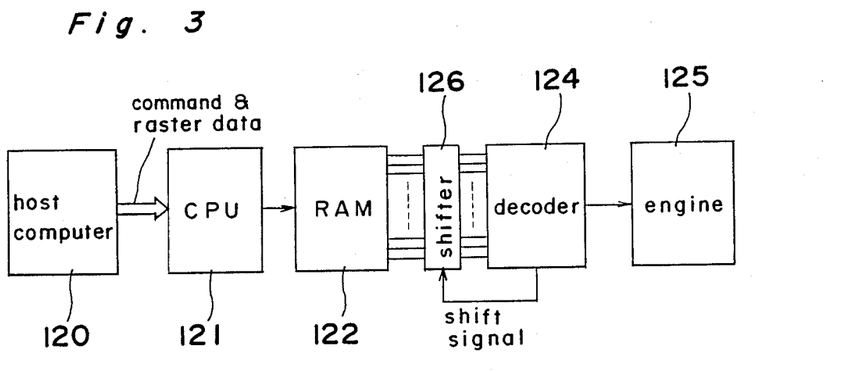
FIG. 3 is another schematic diagram which shows a shifter of the image signal processing unit of the preferred embodiment according to the present invention.

FIG. 3 is another schematic diagram which shows a shifter 126 of the image signal processing unit of the preferred embodiment according to the present invention. In FIG. 3, the operational components that are the same as shown in FIG. 2 are designated by the same respective reference numbers.

Referring to FIG. 3, the image signal processing unit of the preferred embodiment according to the present invention will be described below. After a command and a raster data of an image signal outputted from a host computer 120 are inputted into a CPU 121, the CPU 121 interprets the inputted command and operates in accordance with the content of the command. After the raster data of the image signal is encoded and compressed by the CPU 121 in accordance with a run length of the raster data obtained by referring to a predetermined encoding table, the compressed data has data showing a run length and encoded data of the raster data, and the CPU 121 writes the compressed data into a RAM 122. Then, after a shifter 126 latches the compressed data stored in the RAM 122 in parallel, the shifter 126 shifts the latched data in a predetermiend manner so that a head bit of the coded data designating the run length of the inputted raster data becomes the head of the output data. Then, the printer begins to operate, and the decoder 124 reads the compressed data stored in the shifter 126 into a RAM portion of the decoder 124, and the decoder 124 decodes the compressed data by referring to a predetermined decoding table stored in the decoder 124. The decoded data is then outputted into an engine 125 of the printer. In the image signal processing unit of the aforementioned second preferred embodiment, the compressed data of the raster data is decoded at a higher speed than the conventional image signal processing unit shown in FIG. 1, since the data outputted from the RAM 122 is latched in parallel by one shifting operation by the shifter 126.

The encoding and decoding method of the image signal data used in the aforementioned preferred embodiments will be described below. The Huffman code which can compress image signal theoretically at a maximum compression rate, is modified and is used in order to compress the image signal. Table 1 shows the modified Huffman code, referred to hereinafter as the MH code. In the preferred embodiment according to the present invention, the data of the image signal is encoded in accordance with the run length of the continuous white dots or the continuous black dots of the image signal, referring to the MH code shown in Table 1, resulting in that the encoded data is compressed. The continuous white dots of the image signal are referred to hereinafter as the white run, and the continuous black dots of the image signal are referred to hereinafter as the black run.

The encoding process is performed by referring to an encoding table for compressing data stored in the CPU 121, wherein the run length and the MH code corresponding to the run length of the white run and the black run are stored in the encoding table, as shown in Table 1. In Table 1, in case the run length is in the range of 1792 to 2560, the same MH code is used in common for both the white run and the black run.

TABLE 1

| run length | white run | black run |
|---|---|---|
| 0 | 00110101 | 0000110111 |
| 1 | 000111 | 010 |
| 2 | 0111 | 11 |
| 3 | 1000 | 10 |
| 4 | 1011 | 011 |
| 5 | 1100 | 0011 |
| . | . | . |
| . | . | . |
| . | . | . |
| 63 | 00110100 | 000001100111 |
| 64 | 11011 | 0000001111 |
| 128 | 10010 | 000011001000 |
| 192 | 010111 | 000011001001 |
| . | . | . |
| . | . | . |
| . | . | . |
| 1664 | 011000 | 0000001100100 |
| 1728 | 010011011 | 0000001100101 |
| EOL | 000000000001 | 000000000001 |
| 1792 | 00000001000 | 00000001000 |
| 1856 | 00000001100 | 00000001100 |
| . | . | . |
| . | . | . |
| . | . | . |
| 2496 | 000000011110 | 000000011110 |
| 2560 | 000000011111 | 000000011111 |

TABLE 2

| D | C | B | A | selecting input terminal |
|---|---|---|---|---|
| 0 | 0 | 0 | 0 | D0 |
| 0 | 0 | 0 | 1 | D1 |
| 0 | 0 | 1 | 0 | D2 |
| 0 | 0 | 1 | 1 | D3 |
| . | . | . | . | . |
| . | . | . | . | . |
| . | . | . | . | . |
| 1 | 1 | 1 | 0 | D14 |
| 1 | 1 | 1 | 1 | D15 |

The CPU 121 detects the changing point from the white run, to the black run latching the raster data transferring from the an external unit such as the aforementioned host computer 120, and retrieves and reads the MH code for the white run length in accordance with the dot number of the white run to the changing point, referring to the encoding table for compressing shown in Table 1, then, the CPU 121 writes the MH code signal into the RAM 122. After that, the CPU 121 detects the changing point from the black run to the white run, latching the following raster data transferring from the host computer 120, and the CPU 121 retrieves and reads the MH code signal for the black run length in accordance with the dot number of the black run to the changing point, referring to the encoding table for compressing shown in Table 1, then, the CPU 121 writes the MH code signal into the RAM 122. It is predetermined that the head of the the raster data of each line always is the white run, in case the head of the raster data of a line is the black run, the white run having a length of "0" is inserted before the head of the black run.

Figure 4:
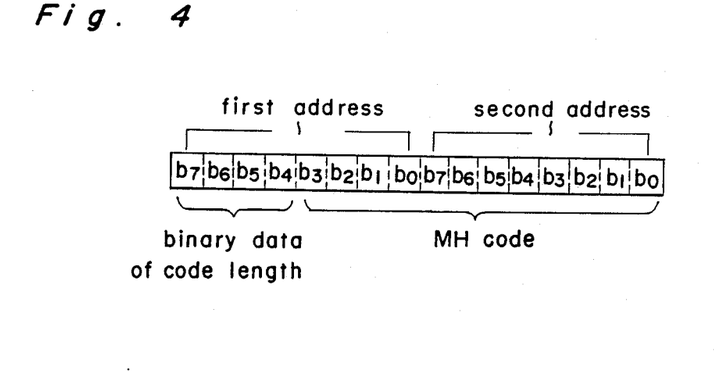
FIG. 4 is a bits array view showing data compressed by the modified Huffman method used in a CPU shown in FIGS. 2 and 3.

The encoded data of the white run has a length of 4 bits to 9 bits and the encoded data of the black run has a length of 2 bits to 13 bits. The MH code, used in common to the white run and the black run when the run length is in the range of 1792 to 2560, has a length of 11 bits or 12 bits. The data outputted into the RAM 122 has a length of 16 bits and consists of 2 bytes corresponding to 2 addresses, which are referred to hereinafter as the first address and the second address, wherein the length of the MH code signal is stored in the higher-order 4 bits of the first address, designated by b7 to b4 shown in FIG. 4, and the MH code signal is left-justified and stored in the following 12 bits, corresponding to b3 to b0 of the first address and b7 to b0 of the second address shown in FIG. 4. In case the MH code signal for the black run has a length of 13 bits, the most significant bit of the MH code signal is omitted and the remaining 12 bits of the MH code signal are stored in the 12 bits corresponding to b3 to b0 of the first address and b7 to b0 of the second address, as shown in FIG. 4.

Figure 5:
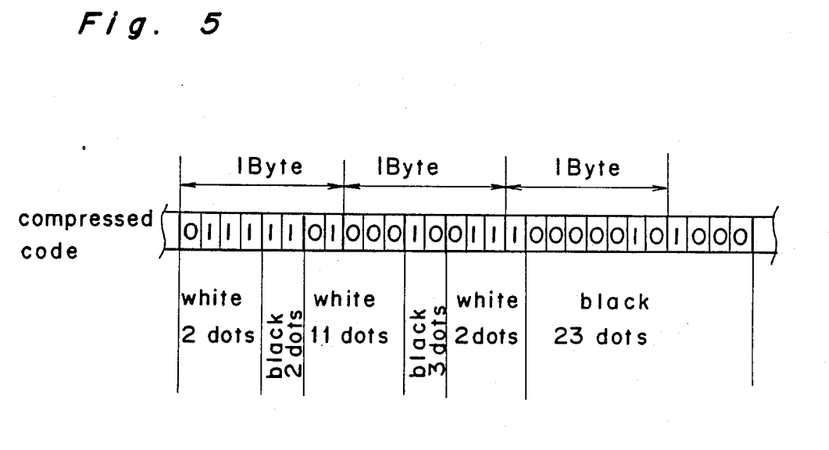
FIG. 5 is a bits array view showing a modified Huffman code written into a RAM shown in FIGS. 2 and 3.

Moreover, the MH code signal, often having a length of 1 bit to 4 bits, is written into the RAM 122 at a length of only 1 byte. In this case, the CPU 121 left-justifies the encoded data without distinguishing the first and the second addresses and outputs the encoded data into the RAM 122, as shown in FIG. 5. Furthermore, when the raster data of a line corresponding to one scanning is all white, the raster data of the line is not encoded, only an end of line code (referring to hereinafter as the EOL code) is outputted into the RAM 122. In case the raster data of a line has all the white data from any position to the end of the line, only the EOL code is outputted into the RAM 122 at the changing points.

Figure 6:
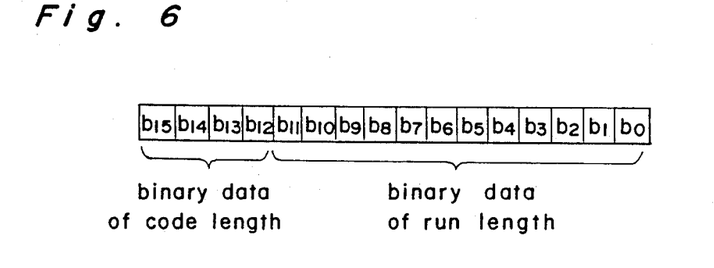
FIG. 6 is a bits array view showing decoded data outputted from a decoder shown in FIGS. 2 and 3.

The decoder 124 comprises a read only memory (referring to hereinafter as the ROM) for decoding the encoded data, wherein the ROM is used as the aforementioned decoding table. In each address of the ROM of the decoder 124, the same data of the MH code signal is respectively stored as the address number of the ROM of the decoder 124. The MH code signal has a maximum length of 13 bits as described above, and also it is necessary to provide 1 bit for distinguishing the white run or the black run, resulting in that the data stored in the ROM of the decoder 124 has a length of 14 bits. Therefore, there is provided 14 address lines in the aforementioned ROM of the decoder 124. As shown in FIG. 6, the data outputted from the ROM of the decoder 124 has a length of 16 bits, which is consisted of 12 bits of the binary data for designating the MH code signal having a length in the range of 0 to 2560, and 4 bits of the binary data for designating the length of the MH code signal having a maximum length of 13 bits. There are provided two ROMs of the decoder 124 for decoding to output the 2 bytes into the engine 125 of the printer.

Figure 7:
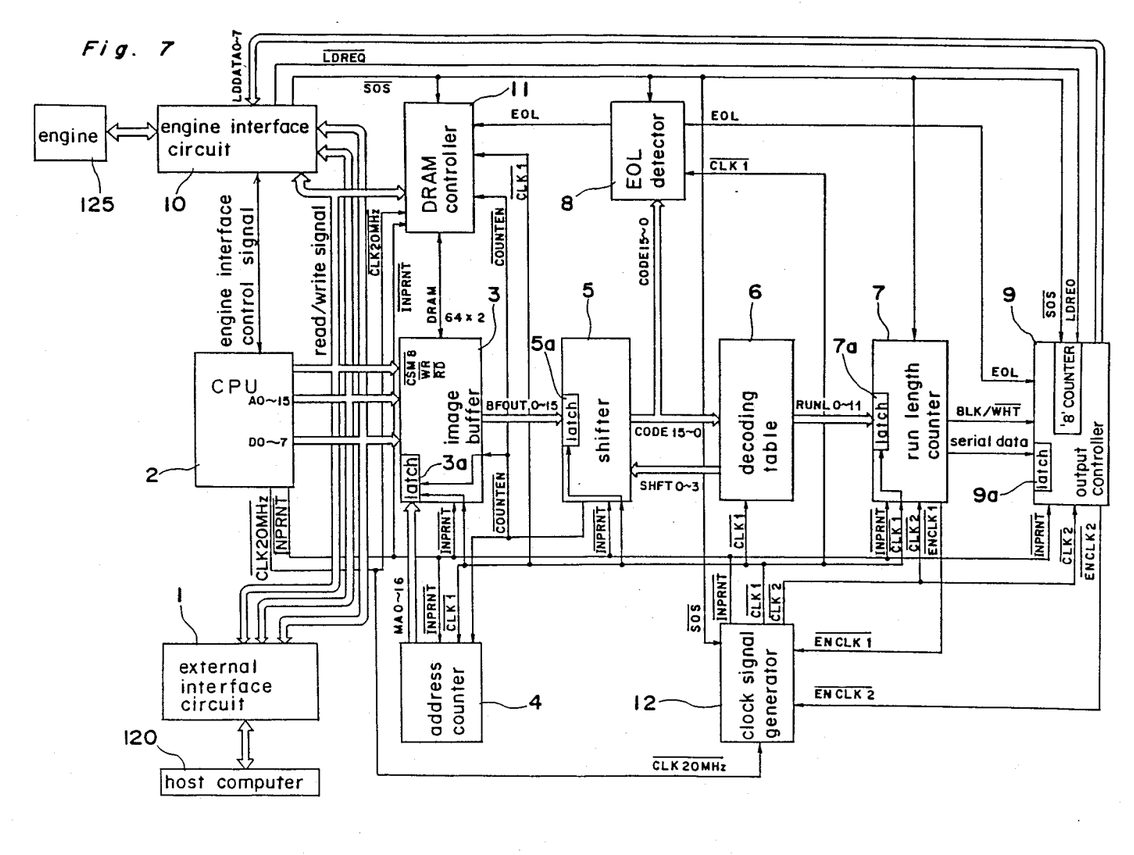
FIG. 7 is a schematic diagram of an image signal processing unit used in the second preferred embodiment shown in FIG. 3.

Referring to FIG. 7, the image signal processing unit of the preferred embodiment according to the present invention will be described below in details.

An external interface circuit 1 is provided for connecting to the host computer 120 outputting the raster data, the interface circuit 1 and the host computer are connected by, for example, a known parallel interface such as Centronics or a known serial interface such as RS-232C, RS-422, etc.

A CPU 2 comprises a microprocessor, a ROM for storing a program for the microprocessor, a RAM for storing the data, and a ROM of the aforementioned encoding table for compressing the inputted raster data into the MH code signal, wherein the ROM of the encoding table is controlled by the processor operating by the program stored in the ROM of the CPU 2. The CPU 2 encodes the raster data outputted from the interface circuit 1 into the MH code signal, and the CPU 2 outputs the encoded data of the MH code signal through a data bus D0 to D7 into an image buffer 3 by a predetermined process described above. The CPU 2 outputs an operation clock signal $\overline{\text{CLK20MHz}}$ into a dynamic RAM controller 11 (referred to hereinafter as the DRAM controller 11), a clock signal generator 12, and the CPU 2 outputs a control signal $\overline{\text{INPRNT}}$ designating the beginning of printing out into the DRAM controller 11, an image buffer 3, an address counter 4, a shifter 5, a run length counter 7, an output controller 9, the clock signal generator 12. The CPU 2 also outputs a read and write signal through a bus into the external interface circuit 1, the image buffer 3, the engine interface circuit 10, and the DRAM controller 11. Instead of the CPU 2, a predetermined hardware circuit may be provided for encoding the raster data into the MH code signal.

The image buffer 3 comprises a dynamic RAM (referred to hereinafter as the DRAM) and a latch circuit 3a, and the DRAM is controlled by the DRAM controller 11. The DRAM controller 11 operates in accordance with the clock signals $\overline{\text{CLK20MHz}}$ and $\overline{\text{CLK1}}$, and controls the DRAM of the image buffer 3 in accordance with the control signal $\overline{\text{INPRNT}}$ outputted from the CPU 2, a control signal $\overline{\text{SOS}}$ outputted from the engine interface circuit 10, and a control signal EOL outputted from the EOL detector 8. The image buffer 3 is connected to the CPU 1 through 16 bits address but A0 to A15 and 8 bit data bus D0 to D7, and the image buffer 3 is connected to an address counter 4 through 17 bits address bus MA0 to MA16. Moreover, the image buffer 3 is connected to the shifter 5 through 16 bit data bus BFOUT0 to BFOUT15.

When the control signal $\overline{\text{INPRNT}}$ outputted from the CPU 2 becomes High level (referring to hereinafter as "H") corresponding to non-active signal (that time is so-called "the writing time" of the image buffer 3 referred to hereinafter as "the CPU mode"), the image buffer 3 is connected to the CPU 2 through the address bus A0 to A15 and the data bus D0 to D7, and the MH code signal compressed in the CPU 2 is written through the data bus D0 to D7 into the image buffer 3, wherein the control signal $\overline{\text{INPRNT}}$ is described below in details. When the control signal $\overline{\text{INPRNT}}$ outputted from the CPU 2 becomes Low level (referring to hereinafter as "L") corresponding to the active level, that time is so-called "the reading time" of the image buffer 3 referred to hereinafter as "the print mode", the image buffer 3 is separated from the CPU 2, and the image buffer 3 is connected to the address counter 4 and the shifter 5.

The address counter 4 is provided for generating an address number for reading the data stored in the RAM of the image buffer 3, and the generated address number is latched into the latch circuit 3a. The data, stored in an address of the RAM of the image buffer 3 which is designated by the address number generated by the address counter 4, is read by 16 bits through the output data bus BFOUT0 to BFOUT15 into the shifter 5. Then, after the shifter 5 latches the data of 16 bits into the latch circuit 5a of the shifter 5 and shifts the latched data by the bits designated by signals outputted from the decoding table 6 through 4 bit data bus SHFT0 to SHFT3, the shifter 5 outputs the shifted signals through 16 bit data bus CODE15 to CODE0 into the decoding table 6 and the EOL detector 8.

Figure 8:
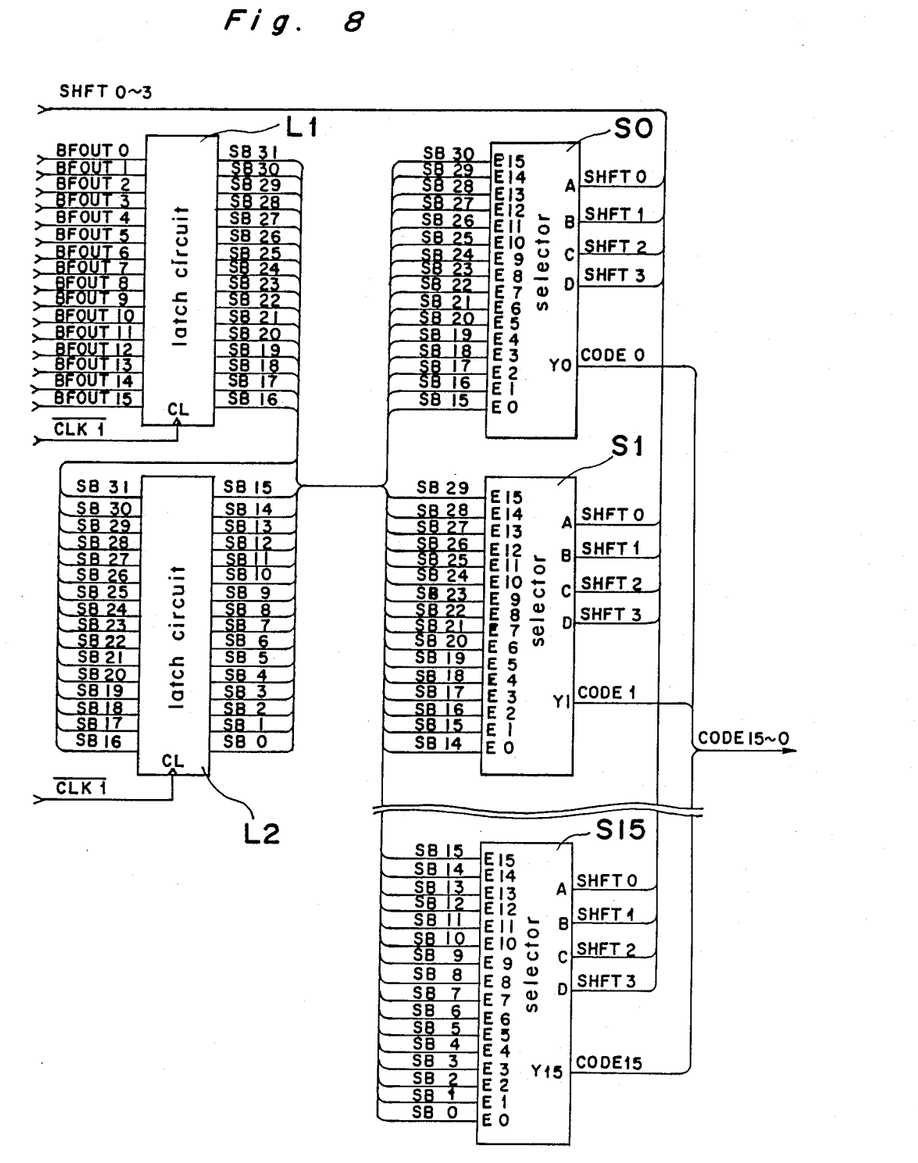
FIG. 8 is a schematic diagram of a shifter shown in FIG. 7.

FIG. 8 is a schematic diagram of the shifter 5, and the shifter 5 will be described below referring to FIG. 8. The shifter 5 comprises 2 latch circuits L1 and L2 of 16 bits, and 16 selectors S0 to S15 for selecting the data inputted from 16 input terminals E0 to E15 and selectively outputting the data inputted into one terminal of the 16 input terminals. The 16 bits output data bus BFOUT0 to BFOUT15 are connected to input terminals of the latch circuit L1, and the clock signal $\overline{\text{CLK1}}$ is inputted into each of clock input terminals CL of the latch circuits L1 and L2. The output terminals of the latch circuit L1 are connected through 16 bit data bus SB16 to SB31 to the input terminals of the latch circuit L2, and the output terminals of the latch circuit L2 are connected through 16 bit data bus SB0 to SB15 to the input terminals E0 to E15 of the selector S15. The input terminals E0 to E15 of the selector S0 are connected through the data bus SB15 to SB30 to the output terminals of the latch circuits L1 and L2, the input terminals E0 to E15 of the selector S1 are connected through the data bus SB14 to SB29 to the output terminals of the latch circuits L1 and L2, and the input terminals E0 to E15 of the selector S2 are connected through the data bus SB13 to SB28 to the output terminals of the latch circuits L1 and L2. The input terminals E0 to E15 of the selectors S3 to S14 are connected in the similar manner to the output terminals of the latch circuit L1 and L2. The binary data of signals designating the aforementioned shifting quantity are respectively inputted through 4 bit data bus SHFT0 to SHFT4 into selecting terminals A, B, C and D of the selector S0 to S15, and the selectors S0 to S15 outputs signals from the output terminals Y0 to Y15 through 16 bit data bus CODE15 to CODE0 into the decoding table 6, respectively.

As described below, after the latch circuit L1 latches the first code data inputted from the image buffer 3 through the data bus BFOUT0 to BFOUT15 at a first trailing edge of the clock signal $\overline{\text{CLK1}}$, the latch circuit L1 outputs the signals SB16 to SB31, and the second code data is inputted through the data bus BFOUT0 to BFOUT15 into the input terminals of the latch circuit L1. Then, the latch circuit L1 latches the second code data inputted from the image buffer through the data bus BFOUT0 to BFOUT15 at a second trailing edge of the clock signal $\overline{\text{CLK1}}$, and the latch circuit L1 outputs the signals through the data bus SB16 to SB31, then the latch circuit L2 outputs the signals through the data bus SB0 to SB15.

Thus, the first code data and the second code data which are consisted of 32 bits signals are simultaneously outputted from the output terminals of the latch circuits L1 and L2 through the 32 bit data bus SB0 to SB31. As described above, the signals designating the shifting quantity are inputted through the data bus SHFT0 to SHFT3 into the selecting terminals A, B, C and D of the selectors S0 to S15. For example, when the signals designating the shifting quantity "3" are inputted through the data bus SHFT0 to SHFT3, each of the input signals inputted through the data bus SB3 to SB18 into each input terminal E3 of the selectors S15 to S0 is respectively outputted from the output terminals Y15 to Y0 of the selectros S0 to S15. Therefore, the 16 bits signals which are selected from the the 32 bits signals inputted through the data bus SB0 to SB31 are outputted through the data bus CODE0 to CODE15 into the decoding table 6 and the EOL detector 8.

Table 2 shows a decoding table for selecting the input terminals D0 to D15 in accordance with the binary bits of 4 bits inputted into the selecting terminals A, B, C and D of the selectors S0 to S15.

Referring to FIG. 7 again, the decoding table 6 comprises a decoding circuit for decoding the signals having the MH code signal outputted from the shifter 5 through the data bus CODE15 to CODE0, and a ROM in which aforementioned the decoding table is stored. The decoding table 6 decodes the inputted signals referring to the ROM of the decoding table 6, resulting in that the decoding table 6 outputs binary data corresponding to the data of the run length through data bus RUNL0 to RUNL11 into a latch circuit 7a of the run length counter 7, and the binary data corresponding to the code length of the inputted MH code signal through the data bus SHFT0 to SHFT3 into the shifter 5. Therefore, after the data latched in the shifter 5 is shifted by the same bits as the length of the MH code signal decoded by the decoding table 6, the shifted data is outputted into the decoding table 6, resulting in that the most significant bit, inputted through the data bus CODE15 of the signals inputted through the data bus CODE15 to CODE0 into the decoding table 6, is followed by the head bit of the following MH code signal to be decoded.

The run length counter 7 outputs a serial black signal BLK or a serial white signal $\overline{WHT}$ in accordance with the binary data of the run length inputted from the decoding table 6, and the run length counter 7 reverses the polarity of the signal BLK/$\overline{WHT}$ every time when a series of the serial data is outputted into a latch circuit 9a of the output controller 9. On the other hand, the data inputted from the decoding table 6 through the data bus RUNL0 to RUNL11 is latched into the latch circuit 7a of the run length counter 7.

When the EOL detector 8 detects the EOL signal of the MH code signal outputted from the shifter 5 through the data bus CODE15 to CODE0, the EOL detector 8 outputs a control signal EOL for printing out all the white dots on the line, into an output controller 9.

The output controller 9 converts a serial data inputted from the run length counter 7 or the control signal EOL inputted from the EOL detector 8 to a predetermined parallel signals outputted through 8 bit data bus LDDATA0 to LDDATA7, and the parallel signals are outputted into the engine interface circuit 10 which is connected to the engine 125 of the printer when a control signal $\overline{LDREQ}$ is inputted from the engine interface circuit 10.

Moreover, the engine interface circuit 10 outputs the control signal $\overline{LDREQ}$ in accordance with a data demand signal outputted from the engine 125 of the printer, and the engine interface circuit 10 outputs an image parallel signal inputted from the output controller 9 through the 8 bit data bus.

The clock signal generator 12 generates the clock signals $\overline{CLK1}$ and $\overline{CLK2}$ for controlling the aforementioned circuits shown in FIG. 7. The control signal $\overline{INPRNT}$ outputted from the CPU 2, a control signal $\overline{ENCLK1}$ outputted from the run length counter 7, a control signal $\overline{ENCLK2}$ outputted from the output controller 9, and the control signal $\overline{SOS}$ outputted from the engine interface 10 are inputted into the clock signal generator 12, and the clock signal generator 12 outputs the clock signals $\overline{CLK1}$ and $\overline{CLK2}$ in accordance with these inputted control signals.

Figure 9:
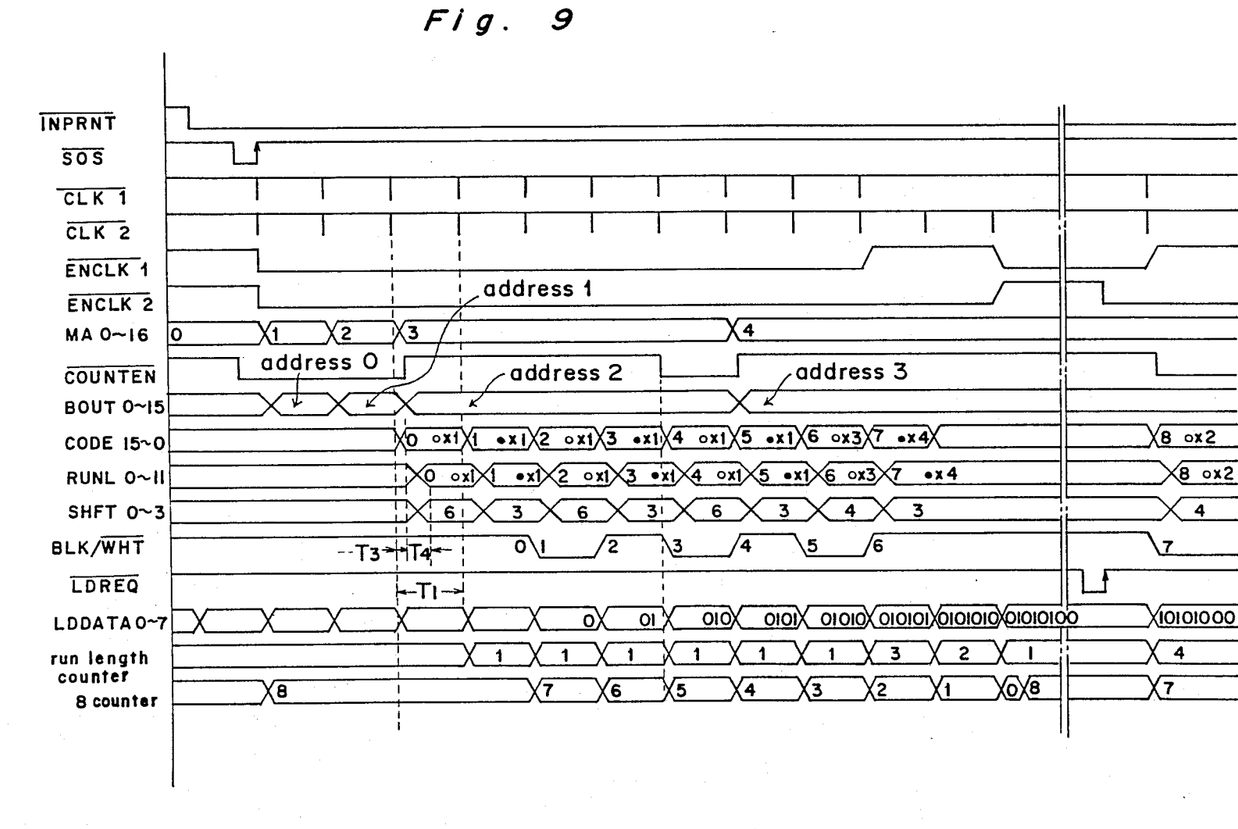
FIG. 9 is a time chart showing an operation of the image signal processing unit shown in FIG. 7.

Referring to a time chart shown in FIG. 9, the operation of the image signal processing unit shown in FIG. 7 will be described below.

When the control signal $\overline{INPRNT}$ outputted from the CPU 2 becomes "H", that is in the CPU mode, the image buffer 3 is connected to the CPU 2 through the address bus A0 to A15 and the data bus D0 to D7, and the MH code signal encoded in the CPU 2 is written through the data bus D0 to D7 into the image buffer 3. In this CPU mode, the CPU 2 outputs the "H" control signal $\overline{INPRNT}$ into the clock signal generator 12, the address counter 4, the shifter 5, the run length counter 7 and the output controller 9, resulting in that the clock signal generator 12, the address counter 4, the shifter 5, the run length counter 7 and the output controller 9 are initialized. As soon as the data of one page of the print paper is written into the image buffer 3, the CPU 2 makes the engine interface circuit 10 begin to operate by outputting an engine interface control signal into the engine interface circuit 10.

Moreover, when the control signal $\overline{INPRNT}$ outputted from the CPU 2 becomes "L", that is in the print mode, the image buffer 3 is separated from the CPU 2, and the image buffer 3 is connected to the address counter 4 through the bus MA0 to MA16, and to the shifter 5 through the data bus BFOUT0 to BFOUT15. In this print mode, the CPU 2 outputs the "L" control signal $\overline{INPRNT0}$ or the active signal into the clock signal generator 12, the address counter 4, the shifter 5, the run length counter 7 and the output controller 9, and then, the clock signal generator 12, the address counter 4, the shifter 5, the run length counter 7 and the output controller 9 are enabled by the "L" control signal $\overline{INPRNT}$.

Then, when a sycnhronizing signal of scanning start of a line is inputted from the engine 125 of the printer into the engine interface circuit 10, the engine interface circuit 10 outputs the signal $\overline{SOS}$ which becomes the "L" level signal for a predetermined time into the DRAM controller 11, the EOL detector 8, the run length counter 7, the output controller 9, and the clock signal generator 12. In accordance with the control signal $\overline{SOS}$, at the leading edge of the control signal $\overline{SOS}$, the run length counter 7 outputs "L" control signal $\overline{ENCLK1}$ or the active signal into the clock signal generator 12, and also the output controller 9 outputs "L" control signal $\overline{ENCLK2}$ or the active signal into the clock signal generator 12, wherein the "L" control signal "$\overline{ENCLK1}$" and the "L" control signal $\overline{ENCLK2}$ are outputted for enabling the clock signals $\overline{CLK1}$ and $\overline{CLK2}$, respectively. That is, in accordance with the "L" control signal $\overline{ENCLK1}$, the clock signal generator 12 repeatedly outputs the "L" control signal $\overline{CLK1}$ having a predetermined pulse width at a predetermined period time T1 into the address counter 4, the image buffer 3, the shifter 5, the decoding table 6, the run length counter 7, the EOL detector 8 and the DRAM controller 11. On the other hand, in accordance with the "L" control signal $\overline{ENCLK2}$, the clock signal generator 12 repeatedly outputs the "L" control signal $\overline{CLK2}$ having a predetermined pulse width at the predetermined period time T1, into the run length counter 7 and the output controller 9. In each of the aforementioned circuits into which the control signals $\overline{ENCLK1}$ or $\overline{ENCLK2}$ is inputted, the processing assigned to each of the aforementioned circuits is set about at the trailing edge of the control signals $\overline{\text{ENCLK1}}$ or $\overline{\text{ENCLK2}}$, and the processing is completed until the trailing edge of the next control signals $\overline{\text{ENCLK1}}$ or $\overline{\text{ENCLK2}}$.

In this print mode, as soon as the address counter 4 outputs counting address data of 17 bits every trailing edge of the clock signal $\overline{\text{CLK1}}$, through the bus MA0 to MA16 into the image buffer 3, in accordance with the counting address data, the image buffer 3 outputs the compressed data stored in the DRAM of the image buffer 3, through the data bus BFOUT0 to BFOUT15 into the latch circuit 5a of the shifter 5. Moreover, when a "H" control signal $\overline{\text{COUTEN}}$ is outputted from the shifter 5 into the image buffer 3, the DRAM controller 11, and the address counter 4, the address counter 4 does not output the counting address data even though the "L" control signal $\overline{\text{CLK1}}$ is inputted into the address counter 4.

As described above, the shifter 5 latches the data inputted from the image buffer 3, and the shifter 5 shifts the latched data, so that the most significant bit, outputted through the bus CODE15 of the 16 bits outputted through the data bus CODE15 to CODE0, is followed by the head bit of the next MH code signal to be decoded, then the shifter 5 outputs the shifted data through the data bus CODE15 to CODE0 into the decoding table 6. The decoding table 6 encodes the MH code signal inputted through the bus CODE15 to CODE0 to the 12 bits binary data, and the 12 bits binary data is outputted through the bus RUNL0 to RUNL11 into the latch circuit 7a of the run length counter 7. The run length counter 7 outputs serial data designating the run length of the white dots or the black dots into the output controller 9, and the run length counter 7 reverses the signal BLK/$\overline{\text{WHT}}$ designating the white dot or the black dot, outputting the serial data designating the length of the white dots or the black dots, so that the signal BLK/$\overline{\text{WHT}}$ designating the white dot is "L" and the signal BLK/$\overline{\text{WHT}}$ designating the black dot is "H". Then, the run length counter 7 outputs the signal BLK/$\overline{\text{WHT}}$ into the output controller 9, wherein the signal BLK/$\overline{\text{WHT}}$ is made "H" at the trailing edge of the aforementioned control signal $\overline{\text{SOS}}$.

Furthermore, the run length value inputted at the trailing edge of the clock signal $\overline{\text{CLK1}}$ is preset in a RAM of the run length counter 7. When the preset run length value is "0", the run length counter 7 reverses the signal BLK/$\overline{\text{WHT}}$. On the other hand, the preset run length value is "1", the run length counter 7 reverses the signal BLK/$\overline{\text{WHT}}$ at the trailing edge of the clock signal $\overline{\text{CLK2}}$. Moreover, when the preset run length value is more than 2, the run length counter 7 makes the control signal $\overline{\text{ENCLK1}}$ "H" or non-active so as to inhibit the clock signal $\overline{\text{CLK1}}$ from outputting, resulting in that disabling the image buffer 3, the address counter 4, the shifter 5, the decoding table 6, the run length counter 7, the EOL detector 8, and the DRAM controller 11. The run length counter 7 decreases the aforementioned preset value 1 by 1 every trailing edge of the clock signal $\overline{\text{CLK2}}$. When the preset value becomes "1", the run length counter 7 reverses the signal BLK/$\overline{\text{WHT}}$ and makes the control signal $\overline{\text{ENCLK1}}$ "L" or active.

The output controller 9 comprises an eight counter into which "8" is set at the trailing edge of the control signal $\overline{\text{SOS}}$. Every trailing edge of the clock signal $\overline{\text{CLK2}}$, the latch circuit 9a of the the output controller 9 latches the serial data outputted from the run length counter 7, and the eight counter of the output controller 9 decreases the set value 1 by 1. When the set value becomes "0", the counter of the output controller 9 set "8" again, and the output controller 9 makes the control signal $\overline{\text{ENCLK2}}$ "L" or non-active so as to inhibit the clock signals $\overline{\text{CLK1}}$ and $\overline{\text{CLK2}}$ from outputting, resulting in that disabling the image buffer 3, the address counter 4, the shifter 5, the decoding table 6, the run length counter 7, the EOL detector 8, the output controller 9, and the DRAM controller 11. Then, the 8 bit data has already latched in the latch circuit 9a of the output controller 9. At the trailing edge of a control signal $\overline{\text{LDREQ}}$ outputted from the engine interface circuit 10, the output controller 9 outputs 8 bit data in parallel through data bus LDDATA0 to LDDATA7 and the engine interface circuit 10 into the engine 125 of the printer, then the output controller 9 makes the control signal $\overline{\text{ENCLK2}}$ "L" or active. When the control signal EOL outputted from the EOL detector 8 is inputted into the output controller 9, the output controller 9 makes the control signal $\overline{\text{ENCLK2}}$ "H" or non-active. Then, the output controller 9 makes the control signal $\overline{\text{ENCLK2}}$ "L" or active at the next trailing edge of the control signal $\overline{\text{SOS}}$. After the control signal EOL is inputted, the output controller 9 neglects the serial data outputted from the run length counter 7, for the time from the leading edge of the the control signal $\overline{\text{LDREQ}}$ to the trailing edge of the control signal $\overline{\text{SOS}}$.

As described above, in the image signal processing unit of the preferred embodiment shown in FIG. 7, the signal processing in each of the circuits is not performed step by step, and each of the circuits is controlled by the same clock signals $\overline{\text{CLK1}}$ and/or $\overline{\text{CLK2}}$, thereby the signal processing assigned in each of the circuits is performed in parallel at the interval of the clock signals $\overline{\text{CLK1}}$ and/or $\overline{\text{CLK2}}$. That is, if the address counter 4 generates the addresses of the DRAM of the image buffer 3 in the order of the addresses a→b→c→d→e→f by the trailing edge of the control signal $\overline{\text{CLK1}}$, the latch circuit 3a of the image buffer 3 latches the compressed data stored in the address e of the RAM of the image buffer 3 (a compressed data stored in an address x of the RAM of the image buffer 3 is referred to hereinafter as the data of the address x), at the time t1 when the address f is generated at a trailing edge of the clock signal $\overline{\text{CLK1}}$, and the image buffer 3 sets the data of the address e into an output buffer of the image buffer 3 until the time t2 at the next trailing edge of the control signal $\overline{\text{CLK1}}$, wherein the output buffer of the image buffer 3 is connected to the data bus BFOUT0 to BFOUT15. On the other hand, the shifter 5 latches the data of the address d inputted from the image buffer 3 through the data bus BFOUT0 to BFOUT15 at the time t1, and the decoding table 6 sets the data of the address d into an output buffer of the decoding table 6 until the time t2, wherein the output buffer of the decoding table 6 is connected to the data bus RUNL0 to RUNL11. Moreover, the latch circuit 7a of the run length counter 7 latches the data of the address c inputted through the data bus RUNL0 to RUNL11 at the time t1, the output controller 9 latches the signal BLK/$\overline{\text{WHT}}$ at the time t1, the signal BLK/$\overline{\text{WHT}}$ being outputted from the run length counter 7 in accordance with the data of the address b.

Thus, the image signal for printing out can be processed at a higher speed than the aforementioned conventional image signal processing unit, since each of the circuits of the image signal processing unit shown in FIG. 7 processes the different data from the data processed by the other circuits, independent of the other circuits within the predetermined time, corresponding to the period time of the clock signals $\overline{CLK1}$ and/or $\overline{CLK2}$. The data of the maximum 16 bits are shifted by one shifting operation, since the parallel shifter is used as the shifter 5, resulting in that the compressed data can be decoded at a higher speed than the aforementioned conventional image signal processing unit.

In the aforementioned preferred embodiments, the image signal processing unit used for the electrophotographic printer is described above, however, the subject matter of the present invention is not limited to this case, the present invention can be provided for an image signal forming unit in which a speed of a sub scanning direction can not be changed or is not preferably changed, such as a CRT display unit etc..

In the aforementioned preferred embodiments, the processing speed of the decoding table 6 is a significant factor, the processing speed of the decoding table 6 is depend on the access time into the ROM of the decoding table 6 where the decoding table of the MH code signal is stored. It takes the processing time T3 for the shifter 5 to process the data inputted through the bus BFOUT0 to BFOUT15 after the signals designating the shifting quantity are inputted from the decoding table 6 through the bus SHFT0 to SHFT3 into the shifter 5, and it takes the processing time T4 for the decoding table 6 to process the data inputted through the bus CODE15 to CODE0, and to output the run length data inputted through the bus RUNL0 to RUNL11 into the latch circuit 7a of the run length counter 7, resulting in that it takes the total processing time (T3 + T4) to decode the compressed data, the total processing time (T3 +T4) referring to hereinafter as "the decoding time". When the run length is "1" or "0", it takes the decoding time (T3+T4) to decode the image signal of one dot, resulting in that it takes the longest time of the decoding time per one dot. Therefore, the period time of the dot clock for printing out one dot is equal to or longer than 1/(T3+T4). In case the image signal forming unit has a dot clock period of 1/(T3+T4), the frequency of the dot clock is approximately 3 MHz, resulting in that there is a problem that a clock frequency of an electrophotographic printer can not be higher than approximately 3 MHz.

Figure 10:
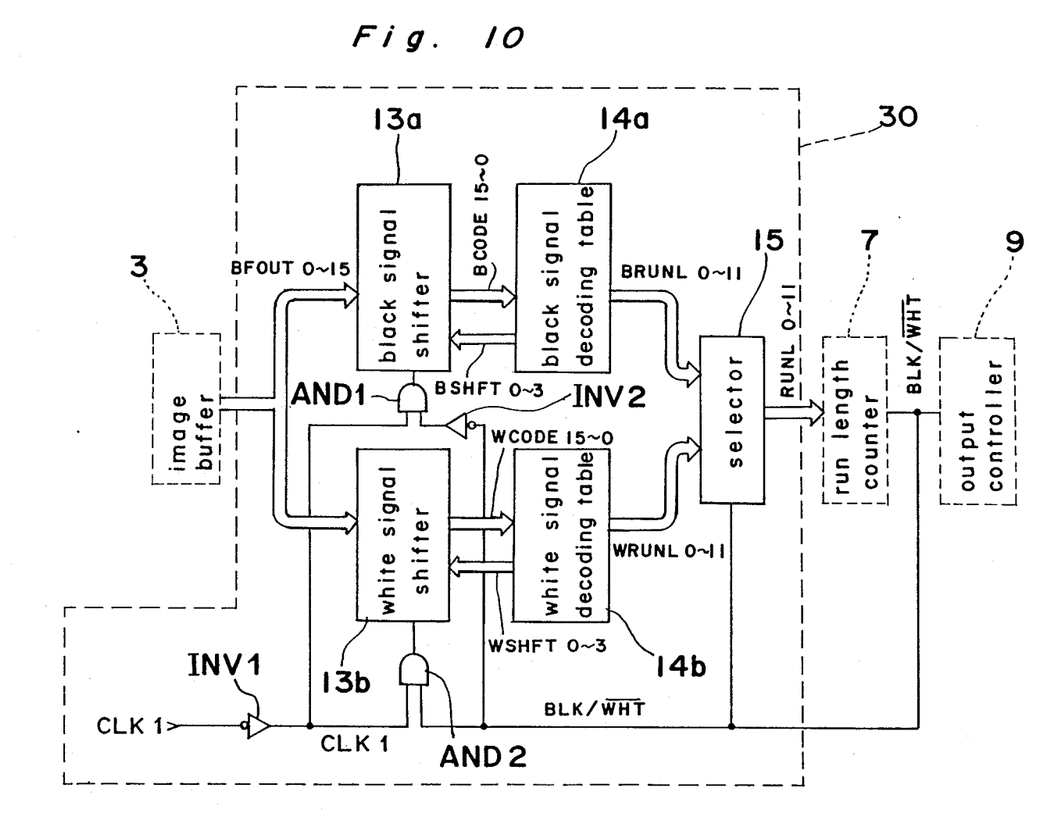
FIG. 10 is a schematic diagram of an image signal decoding unit of a preferred embodiment according to the present invention.

FIG. 10 shows an image signal decoding unit 30 of a preferred embodiment according to the present invention. The image signal decoding unit 30 can be used in the image signal processing unit shown in FIG. 7, instead of the shifter 5 and the decoding table 7 shown in FIG. 7. In FIG. 10, the image signal decoding unit 30 comprises a pair of image signal decoding circuits, being respectively consisted of black signal shifter 13a, white signal shifter 13b and black signal decoding table 14a, white signal decoding table 14b, in which the white data and the black data of the compressed data of the image signal are separately processed.

The compressed data of the image signal are respectively inputted through the bus BFOUT0 to BFOUT15 into the black signal shifter 13a and the white signal shifter 13b, and the shifted data outputted from the black signal shifter 13a and the white signal shifter 13b are respectively outputted through a pair of 16 bit data bus BCODE15 to BCODE0 and WCODE15 to WCODE0 into the black signal decoding table 14a and the white signal decoding table 14b. Then, the black signal decoding table 14a and the white signal decoding table 14b output the signals designating the shifting quantity through 4 bits bus BSHFT0 to BSHFT3 and WSHFT0 to WSHFT3 into the shifters 13a and 13b, respectively. The block signal decoding table 14a and the white signal decoding table 14b output the decoded run length data through 12 bit data bus BRUNL0 to BRUNL11 and 12 bit data bus WRUNL0 to WRNUNL11 into a selector 15, respectively.

The clock signal $\overline{CLK1}$ outputted from the clock signal generator 12 shown in FIG. 7 is inputted through an inverter INV1 into a first input terminal of an AND gate AND1 and a first input terminal of an AND gate AND2, on the other hand, the signal BLK/$\overline{WHT}$ outputted from then run length counter 7 shown in FIG. 7 is inputted into the the output controller 9, the selector 15, a second input terminal of the AND gate AND2 and an input terminal of an inverter INV2. Moreover, an output terminal of the inverter INV2 is connected to a second input terminal of the AND gate AND1. Each of output terminals of the AND gates AND1 and AND2 is respectively connected to the black signal shifter 13a and the white signal shifter 13b.

The operation of the image signal decoding unit 30 shown in FIG. 10 will be described below. The "H" signal is inputted into the first input terminal of each of the AND gates AND1 and AND2 every trailing edge of the clock signal $\overline{CLK1}$. When the signal BLK/$\overline{WHT}$ outputted from the run length counter 7 is BLK or "H", the AND gate AND1 is disabled and the AND gate AND2 is enabled, resulting in that the reversed clock signal $\overline{CLK1}$ is inputted into the white signal shifter 13b. After that, at the next trailing edge of the clock signal $\overline{CLK1}$, the signal BLK/$\overline{WHT}$ is $\overline{WHT}$ or "L", then, the AND gate AND1 is enabled and the AND gate AND2 is disabled, resulting in that the clock signal $\overline{CLK1}$ is inputted into the black signal shifters 13a. Thus, in accordance with the signal BLK/$\overline{WHT}$ outputted from the run length counter 7, either of the block signal shifter 13a or the white signal shifter 13b is enabled. The enabled black signal shifter 13a and the enabled white signal shifter 13b output the compressed data of the black dots and the white dots into the black signal decoding table 14a and the white signal decoding table 14b, respectively. The the black signal decoding table 14a and the white signal decoding table 14b decode the compressed data inputted through the data bus BCODE15 to BCODE0 and WCODE15 to WCODE0, respectively, outputting the decoded data through the data bus BRUNL0 to BRUNL11 and WRUNL0 to WRUNL11, into the selector 15.

The selected 15 selectively outputs the decoded data inputted from the the black signal decoding table 14a through the data bus BRUNL0 to BRUNL11 and the decoded data outputted from the white signal decoding table 14b through the data bus WRUNL0 to WRUNL11, into the run length counter 7, in accordance with the signal BLK/$\overline{WHT}$. That is, if the signal BLK/$\overline{WHT}$ is "H" or active and the "H" BLK signal is inputted into the selector, the selector 15 outputs the decoded data inputted through the data bus BRUNL0 to BRUNL11, through the data bus RUNL0 to RUNL11 into the run length counter 7. On the other hand, if the signal BLK/$\overline{WHT}$ is "L" or non-active and the "L" $\overline{WHT}$ signal is inputted into the selector, the selector 15 outputs the decoded data WRUNL0 to WRUNL11, through the data bus RUNL0 to RUNL11 into the run length counter 7. Thus, in the image signal decoding unit 30 shown in FIG. 10, the compressed data is decoded at a higher speed than the image signal decoding unit comprising the shifter 5 and the decoding table 6 shown in FIG. 7.

Figure 11:
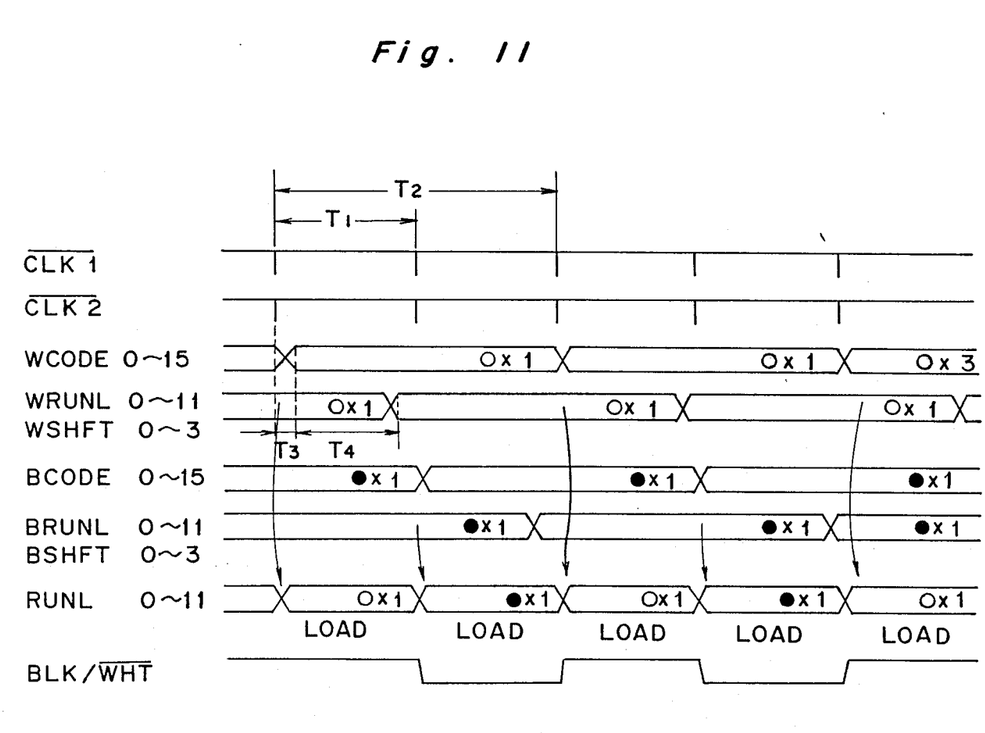
FIG. 11 is a time chart showing the operation of the image signal decoding unit shown in FIG. 10, having the same period time T1 of a clock signal as a period time T1 of a clock signal used in the image signal processing unit shown in FIG. 7.

FIG. 11 is a time chart showing the operation of the image signal decoding unit shown in FIG. 10, wherein the period time of the clock signals $\overline{CLK1}$ and $\overline{CLK2}$ is T1 which is the same time as the period time of the clock signals $\overline{CLK1}$ and $\overline{CLK2}$ in the image signal processing unit shown in FIG. 7. In the image signal processing unit shown in FIG. 7, it takes the aforementioned processing time T3 in the shifter 5 and the aforementioned processing time T4 in the decoding table 6, to decode the compressed data of the image signal, and it is necessary to decode the compressed data within the period time T1 of the clock signals $\overline{CLK1}$ and $\overline{CLK2}$. However, in the image signal decoding unit 30 shown in FIG. 10, the decoding process may be performed within twice the period time T2 of the clock signals $\overline{CLK1}$ and $\overline{CLK2}$, resulting in there is provided a longer margin time being T2 minus (T3+T4) than the margin time being T1 minus (T3+T4) in the image signal processing unit shown in FIG. 7.

Figure 12:
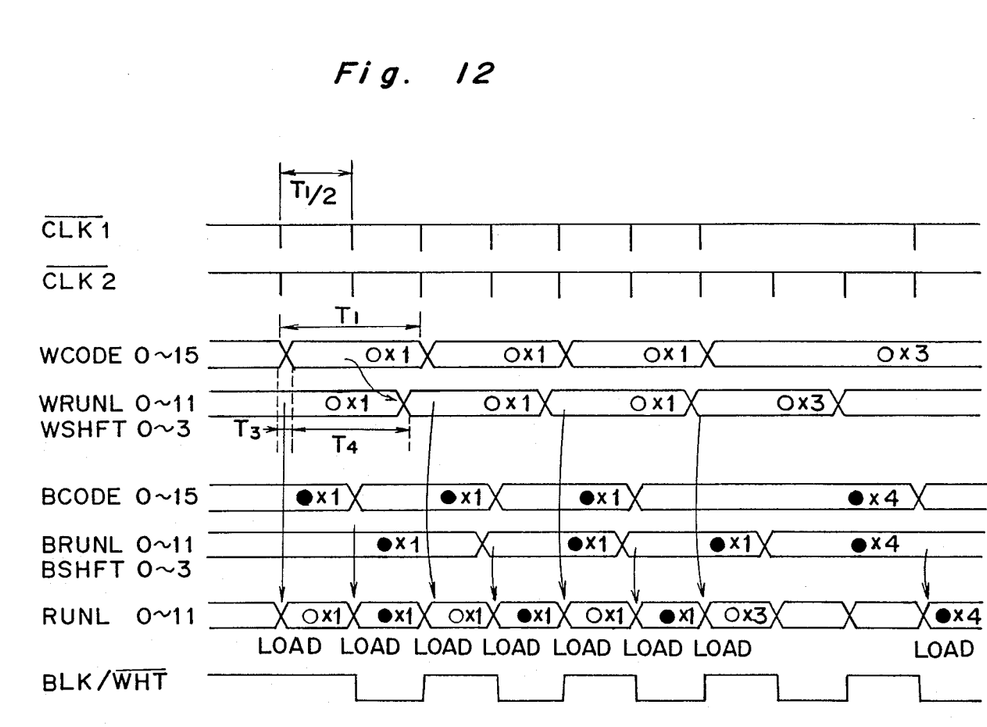
FIG. 12 is a time chart showing the operation of the image signal decoding unit shown in FIG. 10, having half the period time T1/2 of a clock signal as the period time T1 of the clock signal used in the image signal processing unit shown in FIG. 7.

As shown in FIG. 12, in the image signal decoding unit shown in FIG. 10, the period time of the clock signals $\overline{CLK1}$ and $\overline{CLK2}$ may be T1/2 being the half the period time of the clock signals $\overline{CLK1}$ and $\overline{CLK2}$ in the image signal processing unit shown in FIG. 10. In this case, the compressed data is decoded at twice the speed in the image signal processing unit shown in FIG. 10.

What is claimed is:

1. A signal processing device provided between an image signal generating device for outputting an image signal having dot data representing white dots and black dots and an image forming device for displaying or printing out a dot image in according with the image signal outputted from the image signal generating device, said signal processing device being provided for outputting the dot data of the image signal synchronously with an image forming operation of said image forming device, said signal processing device comprising:

data encoding means for compressing the image signal outputted from said image signal generating device to a coded signal including a plurality of run length codes, each run length code including a head bit and representing a run length corresponding to the number of dots in a continuous run of white dots or black dots;

buffer memory means for continuously storing the coded signal outputted from said data encoding means as a consecutive series of bits, and for outputting the stored coded signal as parallel groups of said bits, each group including a predetermined number of said bits;

address counting means for applying an address to said buffer memory means of each said group of bits to cause outputting of said groups of bits from said buffer memory means;

shifting means for outputting a data read demand signal to said buffer memory means, for receiving each said group of bits output by said buffer memory means, for outputting a shifted coded signal, and for shifting each said group of bits a selected number of bits designated by a shifting signal so that a head bit of a run length code in each said groups of bits becomes an end bit of the outputted shifted coded signal;

decoding memory means for converting the shifted coded signal outputted from said shifting means to a run length signal containing information indicating the run length represented by each run length code in the coded signal, and for outputting said shifting signal designating said selected number of bits to said shifting means;

run length counting means receiving said run length signal for serially outputting an image signal representing the run lengths indicated by the run length signal, and for outputting a distinguishing signal for designating whether the image signal represents a run of white dots or black dots;

clock signal generating means for generating a clock signal for driving said address counting means, generation of the clock signal being selectively inhibited during operation of the run length counting means; and output control means for converting the image signal outputted from said run length counting means to a parallel image signal and for outputting the parallel image signal in accordance with a data demand signal outputted from said image forming device;

the clock signal being further inputted into said buffer memory means, said shifting means, said decoding memory means, and said run length counting means; and said buffer memory means, said shifting means, said decoding memory means, and said run length counting means performing the respective functions of outputting one of said groups of bits, shifting one of said groups of bits, converting said shifted coded signal, and outputting said image signal within the period of the clock signal.

2. The signal processing device as defined in claim 1, wherein said signal processing device is operable in a data writing mode wherein the coded signal outputted by said data encoding means is stored in said buffer memory means during a selected period and in a data reading mode wherein said groups of bits are outputted by said buffer memory means and received by said shifting means, and wherein said signal processing device further includes:

mode switching means for switching between said data writing mode and said data reading mode;

connection means for connecting said buffer memory means to said data encoding means when said mode switching means switches to the data writing mode; and means for initializing said address counting means, said clock signal generating means, said shifting means, said run length counting means, and said output control means when said mode switching means switches to the data writing mode.

3. The signal processing device as defined in claim 2, wherein, at the end of said selected period, said mode switching means switches to the data reading mode, isolates said buffer memory means from said data encoding means, and enables operation of said address counting means, said clock signal generating means, said shifting means, said run length counting means, and said output control means.

4. The signal processing device as defined in claim 1, wherein said signal processing device comprises a pair of said shifting means and a pair of said decoding memory means.

5. The signal processing device as defined in claim 1, wherein said buffer memory means, said shifting means, said run length counting means, and said output control means each include a latch circuit means for latching, respectively, the coded signal, each said group of bits, said run length signal and said image signal.

6. A signal processing device comprising:

data encoding means for encoding a plurality of continuous runs of white dots or black dots represented by an image signal outputted from an image signal generating device into plurality of run length codes, each run length code including a head bit and representing a run length corresponding to the number of dots in continuous run of white dots or black dots;

buffer memory means for continuously storing said run length codes as a consecutive series of bits and for outputting the stored series of bits as successive parallel groups of said bits, each group having a predetermined number of bits, in response to respective output addresses;

address counting means for outputting output addresses to said buffer memory means;

parallel shifting means for receiving each group of bits outputted by said buffer memory means and responsive to a shift signal for shifting each group of bits a selected number of bits to form an output group of bits wherein the head bit of a run length code in each said group of bits becomes an end bit of the output group of bits;

decoding memory means for converting the output group of bits to a run length signal containing information defining the run length represented by said run length code and for outputting said shift signal as binary bits to said parallel shifting means;

run length counting means receiving the run length signal for outputting an image signal representing the run length defined by the run length signal, and for outputting a distinguishing signal for designating whether the image signal represents a run of white dots or black dots; and clock signal generating means for generating a clock signal for driving said address counting means, generation of the clock signal being selectively inhibited during operation of the run length counting means;

the clock signal being comprised of clock pulses being inputted into said buffer memory means, said parallel shifting means, said decoding memory means, and said run length counting means; and said buffer memory means, said shifting means, said decoding memory means, and said run length counting means performing the respective functions of outputting a group of bits, shifting said group of bits, converting said output group of bits, and outputting said image signal within the period of the clock signal.

7. The signal processing device as defined in claim 6 wherein:

said buffer memory means latches a portion of the run length codes each time a clock pulse is inputted to said buffer memory means and continues outputting the latched portion until the next clock pulse is inputted thereto;

said parallel shifting means latches the group of bits outputted from said buffer memory means and outputs the output group of bits each time a clock pulse is inputted to said parallel shifting means, and continues outputting the output group of bits until the next clock pulse is inputted thereto; and said run length counting means latches the run length signal outputted from said decoding memory means and outputs the image signal each time a clock pulse is inputted to said run length counting means and continues outputting the image signal until the next clock pulse is inputted thereto.

8. The signal processing device as defined in claim 7, wherein said decoding memory means stores length data designating the number of bits in each output group of bits and, when said decoding memory means converts an output group of bits to a run length signal, said decoding memory means feeds back the corresponding length data as said shift signal to said parallel shifting means; and wherein, in accordance with the fed back shift signal, said parallel shifting means shifts each group of bits received from said buffer memory means by the number of bits designated by the fed back shift signal.

9. The signal processing device as defined in claim 6, wherein said signal processing device comprises a pair of said parallel shifting means and a pair of said decoding memory means.

10. The signal processing device as defined in claim 9, wherein said decoding memory means stores length data designating the number of bits in each output group of bits and, when said decoding memory means converts an output group of bits to a run length signal, said decoding memory means feeds back the the corresponding length data as said shift signal to said parallel shifting means; and wherein, in accordance with the fed back shift signal, said parallel shifting means shifts each group of bits received from said buffer memory means by the number of bits designated by the fed back shift signal.

11. The signal processing device as defined in claim 6, wherein said signal processing device is operable in a data writing mode wherein the run length codes outputted by said data encoding means are stored in said buffer memory means during a selected period and in a data reading mode wherein said groups of bits are outputted by said buffer memory means and received by said parallel shifting means, and wherein said signal processing device further includes:

mode switching means for switching between said data writing mode and said data reading mode;

connection means for connecting said buffer memory means to said data encoding means when said mode switching means switch to the data writing mode; and means for initializing said address counting means, said parallel shifting means, and said run length counting means when said mode switching means switches to the data writing mode.

12. The signal processing device as defined in claim 11, wherein, at the end of said selected period, said mode switching means switches to the data reading mode, isolates said buffer memory means from the data encoding means, and enables operation of said address counting means, said parallel shifting means, and said run length counting means.

13. The signal processing device as defined in claim 6, wherein said decoding memory means stores length data designating the number of bits in each output group of bits and, when said decoding memory means converts an output group of bits to a run length signal, said decoding memory means feeds back the corresponding length data as said shift signal to said parallel shifting means; and wherein, in accordance with the fed back shift signal, said parallel shifting means shifts each group of bits received from said buffer memory means by the number of bits designated by the fed back shift signal.

* * * * *

UNITED STATES PATENT OFFICE
CERTIFICATE OF CORRECTION

Patent No. 4,864,414          Dated September 5, 1989

Inventor(s) Masaaki Nishiyama, et al.

It is certified that error appears in the above-identified patent and that said Letters Patent is hereby corrected as shown below:

On the Cover Sheet,

[73] Assignee: after Kabushiki, delete "Kaishi" and insert --Kaisha--.

Beneath [30], line 4, delete "Jul. 30, 1985" and insert --Jul. 3, 1985--.

Signed and Sealed this

Twenty-third Day of October, 1990

Attest:

HARRY F. MANBECK, JR.

Attesting Officer      Commissioner of Patents and Trademarks